(No Model.)

W. B. WALDRON & G. C. BOLLER.
ATTACHMENT FOR TAMPING TOOLS.

No. 393,945. Patented Dec. 4, 1888.

WITNESSES:
Francis McArdle
C. Sedgwick

INVENTOR:
W. B. Waldron
G. C. Boller
BY Munn & Co.
ATTORNEYS.

UNITED STATES PATENT OFFICE.

WARREN BICKFORD WALDRON AND GEORGE CARL BOLLER, OF FOLSOM CITY, CALIFORNIA.

ATTACHMENT FOR TAMPING-TOOLS.

SPECIFICATION forming part of Letters Patent No. 393,945, dated December 4, 1888.

Application filed March 10, 1888. Serial No. 266,898. (No model.)

*To all whom it may concern:*

Be it known that we, WARREN BICKFORD WALDRON and GEORGE CARL BOLLER, of Folsom City, in the county of Sacramento and State of California, have invented a new and Improved Attachment for Tamping-Tools, of which the following is a full, clear, and exact description.

This invention relates to tamping-tools, the object of the invention being to provide such a tool as is illustrated, described, and claimed in our application No. 240,631, filed on the 8th day of June, 1887, with a spear attachment which may be readily adjusted in place or removed from the socket of the tamping-tool, said spear being of any desired shape or of any proper material, but preferably of plate steel.

Reference is to be had to the accompanying drawings, forming a part of this specification, in which similar figures of reference indicate corresponding parts in all the views.

Figure 1:
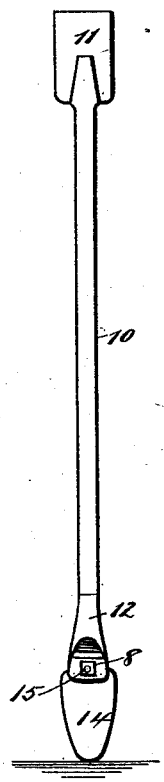
Figure 2:
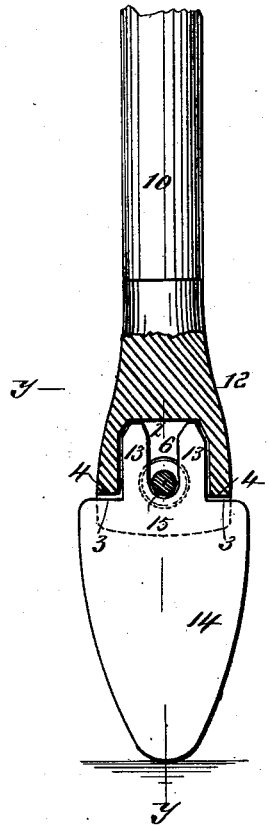
Figure 3:
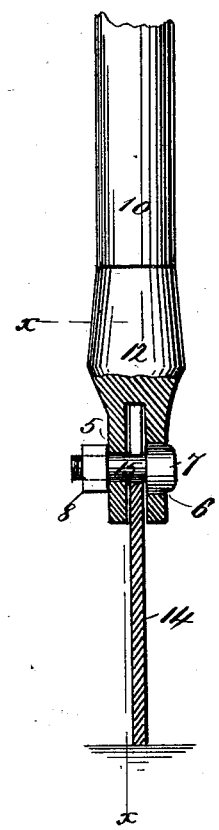

Figure 1 is a face view of a tamping-tool with our spear attachment applied. Fig. 2 is an enlarged detail view thereof, the socket and the retaining-bolt being shown in section on the line $x\,x$ in Fig. 3; and Fig. 3 is a view taken on the broken line $y\,y$ of Fig. 2.

In the drawings, 10 represents a handle, to which there is connected a tamping-head, 11, as described in our application above referred to. To the opposite end of the handle 10 there is welded a socket, 12, or said socket might be attached in any other proper manner. The recess 2 in this socket 12 is arranged to receive the bifurcated shank 13 of a spear, 14, which spear is, preferably, slightly pointed, as represented, but which might be made in any other proper shape, being formed, however, with shoulders 3, which bear against shoulders 4, that extend laterally from the bottom of the main portion of the recess 2, said recess running entirely across the lower end of the socket.

At each side of the recess 2 the walls of the socket are apertured, one of said apertures, that shown at 5, being just large enough to receive the shank of the bolt 15, while the other aperture, 6, is large enough to receive the bolt-head 7, so that when the spear is inserted and the bolt brought into engagement with its nut 8, said nut may be turned home and the approaching face of the bolt-head brought to bear hard against the bifurcated shank of the spear, thus clamping it firmly to place.

From the construction described it will be seen that the spear may be quickly inserted and as readily removed from the socket; but that when once in position for use there will be little, if any, liability of its becoming accidentally displaced.

Having thus fully described our invention, we claim as new and desire to secure by Letters Patent—

1. A tamping-tool comprising the handle, the tamping-head at one end thereof, and the spear at the other end, substantially as set forth.

2. A tamping-tool having a tamping-head at one end and a socket at the other, the spear having a shank entering said socket, and the clamping-bolt, substantially as set forth.

3. In a tamping-tool, the combination, with a handle, of a socket connected thereto, a spear formed with a bifurcated shank arranged to enter the socket-recess, and a clamping-bolt, substantially as described.

4. In a tamping-tool, the combination, with a handle, of a socket connected thereto and formed with a recess, 2, shoulders 4, and apertures 5 and 6, a spear, 14, formed with a bifurcated shank, 13, and shoulders 3, the shank being arranged to enter the recess 2 and the shoulders 3 to bear against the shoulders 4, a bolt, 15, the shank of which passes through the aperture 5, while the spear enters the aperture 6, and a nut, 8, arranged to engage the bolt, substantially as described.

WARREN BICKFORD WALDRON.
GEORGE CARL BOLLER.

Witnesses:
C. E. BURNHAM,
H. J. NORTON.